(12) United States Patent
Smith et al.

(10) Patent No.: US 6,785,015 B1
(45) Date of Patent: Aug. 31, 2004

(54) SYSTEM AND METHOD FOR MONITORING A COMPUTER SYSTEM PROCESS OR PERIPHERAL

(75) Inventors: Marcus A. Smith, Boise, ID (US); David S. Ezekiel, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/439,315

(22) Filed: Nov. 12, 1999

(51) Int. Cl.[7] .......................... G06F 15/00; G06F 13/00
(52) U.S. Cl. ...................... 358/1.15; 358/405; 709/220; 707/10
(58) Field of Search ................... 709/220; 358/1.15, 358/405; 707/10

(56) References Cited

U.S. PATENT DOCUMENTS

| | | | |
|---|---|---|---|
| 4,095,050 A | 6/1978 | Beachem et al. | |
| 5,123,089 A | 6/1992 | Beilinski et al. | |
| 5,414,494 A | 5/1995 | Aikens et al. | |
| 5,512,979 A | 4/1996 | Ogura | 355/204 |
| 5,539,530 A | 7/1996 | Reifman et al. | |
| 5,647,056 A * | 7/1997 | Barrett et al. | 709/220 |
| 5,666,294 A | 9/1997 | Takada et al. | 364/551.01 |
| 5,715,393 A | 2/1998 | Naugle | |
| 5,797,515 A | 8/1998 | Liff et al. | |
| 5,799,206 A | 8/1998 | Kitagawa et al. | 395/856 |
| 5,848,318 A | 12/1998 | Okimoto | 399/8 |
| 5,867,495 A | 2/1999 | Elliott et al. | |
| 5,893,091 A | 4/1999 | Hunt et al. | |
| 5,901,286 A | 5/1999 | Danknick et al. | 395/200.33 |
| 5,930,342 A | 7/1999 | Mazzapica | |
| 6,003,070 A | 12/1999 | Frantz | 709/206 |
| 6,088,125 A * | 7/2000 | Okada et al. | 358/405 |
| 6,230,156 B1 * | 5/2001 | Hussey | 707/10 |
| 6,522,421 B2 * | 2/2003 | Chapman et al. | 358/1.15 |
| 6,581,092 B1 * | 6/2003 | Motoyama et al. | 709/219 |

FOREIGN PATENT DOCUMENTS

| | | |
|---|---|---|
| EP | 0848322 A1 | 6/1998 |
| EP | 1003307 A2 | 5/2000 |
| WO | WO 98/37704 A2 | 8/1998 |
| WO | WO 99/25110 A1 | 5/1999 |
| WO | WO 00/04427 A1 | 1/2000 |

* cited by examiner

*Primary Examiner*—Edward Coles
*Assistant Examiner*—Alan Rahimi (57) ABSTRACT

A computer system includes workstations and a peripheral having a processor. The workstations and the peripheral communicate via email over a network. Email messages include commands and requests that control access to status and reconfiguration of the peripheral, establish subscriptions to status of the peripheral, and invoke reconfiguration of the peripheral. Email messages also include publications of the status of the peripheral according to reporting criteria. Reporting criteria identify a report of process or state variables, define publication criteria for directing the monitoring of state variables, and define delivery criteria to avoid network undesirable network traffic and irritating addressees of subscriptions.

25 Claims, 6 Drawing Sheets

SYSTEM AND METHOD FOR MONITORING A COMPUTER SYSTEM PROCESS OR PERIPHERAL

FIELD OF THE INVENTION

Embodiments of the present invention relate to computer systems having processes or peripheral equipment supported by periodic maintenance or dispatched service, and to methods of maintaining continuous operation of such processes or peripheral equipment, for example, by monitoring status, reporting changes in status, and facilitating reconfiguration.

BACKGROUND OF THE INVENTION

Computer system peripherals perform the input and output functions that give purpose and expression to the computational functions. Unreliability of a computer system peripheral may convey to the users of the computer system a sense that the computer system as a whole is unreliable. Peripherals generally include input devices (e.g., scanners, measurement equipment, keyboards and pointing devices, microphones and cameras), input/output devices (e.g., network interfaces), and output devices (e.g., facsimile transmitters, speakers, monitors, projectors, and printers and plotters for a wide range of media including film, paper, labels, and transparencies).

Because some peripherals include consumable components, require calibration, require cleaning or adjustment, have failure indications that are not readily apparent, or otherwise would remain in operating condition longer if quickly or periodically serviced, it may be cost effective to provide built-in measurement and front panel display capabilities for various conditions regarding peripheral device operation. However, front panel control and display capabilities may be unsatisfactory (e.g., due to fixed location on the peripheral) for informing appropriate personnel of the condition of peripherals so as to reduce the cost of on-site maintenance, for informing users of alternatives when a particular peripheral will be or is unavailable, and for improving surveillance of the utilization of peripherals (e.g., for changes in routine operation, and operations research).

A conventional computer system may have many processes some of which may be operating independently (e.g., a multiuser system) and some may be cooperating as part of a distributed process application programs (e.g., client-server applications or tandem process applications). One or more processors in such a computer system may be involved in performing some or all of a given process. Managing the processes in such a computer system has conventionally been accomplished at a system operation console or by a system operator having system level access privileges. However, limited access to process status and process controls may be unsatisfactory. For example, different users may desire different information from a particular process or different users may be capable of some but not all controls of a particular process. Conventional systems management software is not capable of suitably informing appropriate personnel of the condition of a process so as to reduce operating costs (e.g., process slow downs or blocked processes), informing users of alternatives when a particular process will be or is unavailable, and for improving surveillance of the utilization of processes (e.g., for changes in routine operation, and operations research).

There remains a need for decreasing the cost of maintenance of processes and peripherals. Without improved communication of a process's or a peripheral's operating conditions to appropriate system operators, maintainers, designers, users, component suppliers, and business information processing systems, perceived computer system reliability may continue to decline as the number of peripherals for such computer systems increases.

SUMMARY OF THE INVENTION

A method for monitoring a computer system peripheral, according to various aspects of the present invention includes sending a first message to the peripheral where the first message includes indicia of a subscription for a status of the peripheral; and receiving a plurality of publications from the peripheral where each publication includes a respective value of the status.

Because the peripheral maintains a list of subscriptions for status reporting, changes in status may be reported by publication to subscribers reachable across the network (as opposed to merely a front panel indication). Because any user may at any time send a message to the peripheral to become a subscriber for particular status, personnel appropriate to monitoring or maintaining the peripheral in view of the particular status are suitably informed.

In another implementation according to various aspects of the present invention, a computer system includes workstations and a peripheral having a processor. The workstations are each capable of sending at least one message by email. Such messages include a respective addressee and a request. The peripheral is coupled to the plurality of workstations by a network for communication by email. The processor of the peripheral performs a method including the following steps in any order: (a) posting a plurality of subscriptions, each posted in response to receiving a request comprising a respective status identifier; (b) monitoring status of the peripheral to provide a plurality of values in accordance with a plurality of the respective status identifiers; and (c) sending by email a plurality of publications each comprising a value of the plurality of values and each addressed in accordance with a subscription of the plurality of subscriptions.

By providing email send and receive capability in the peripheral, requests for subscriptions and publications of status reports are communicated in a manner that is efficient in terms of system resources and in terms of interacting with personnel. Mail servers in a network may permit email traffic through fire walls, facilitating access to the peripheral, for example, for monitoring status, for obtaining notice of changes in status, and for reconfiguration all from any station of a network, including a world wide network for email.

In yet another implementation according to various aspects of the present invention, a memory includes indicia of a method for execution by a processor in a peripheral for maintaining a peripheral in a computer system. The peripheral includes a multiplicity of indications of status, each indication identified by a identifier. The method includes the following steps in any order: (a) supporting network communication; (b) monitoring indications of status of the peripheral corresponding respectively to each identifier to provide notice of change of a particular indication; (c) maintaining a list of subscriber entries, each subscriber entry comprising a respective addressee and a respective identifier, the list being maintained in response to receiving network communication; (d) selecting from the list of subscriber entries a plurality of addressees in accordance with the identifier corresponding to the particular indication; and (e) providing notice of the change to each addressee via network communication.

A method for monitoring a process performed by a computer system, according to various aspects of the present invention includes sending to a processor indicia satisfying access control and indicia of a subscription for a status of the process; and receiving a plurality of publications from the processor where each publication includes a respective value of the status.

Because the processor maintains a list of subscriptions for status reporting, particular changes in status may be reported by publication to particular subscribers reachable across the network (as opposed to merely a system manager or system management account). Because any user may at any time send a message to the processor to become a subscriber for particular status, personnel appropriate to monitoring or maintaining the process in view of the particular status are suitably informed.

BRIEF DESCRIPTION OF THE DRAWING

Embodiments of the present invention will now be further described with reference to the drawing, wherein like designations denote like elements, and.

DETAILED DESCRIPTION OF PREFERRED EMBODIMENTS

In systems and methods, according to various aspects of the present invention, the status of a computer system peripheral or process may be monitored and reported by network communication to predefined subscribers. Network communication may also be used, inter alia, to control access to the peripheral or process, to reconfigure the peripheral or process, and to revise subscriptions.

Generally, a computer system includes a computer and one or more computer system peripherals as discussed above. In a computer system having numerous computers coupled by a network for communication, peripherals may be coupled directly to one computer or coupled to the network. Each computer may serve primarily as a workstation (for primary use by an operator, user, or client process) or as a server. Network communication includes any manner of providing information from one process to another across a network, each process being executed by the processor in a computer or in a peripheral.

Figure 1:
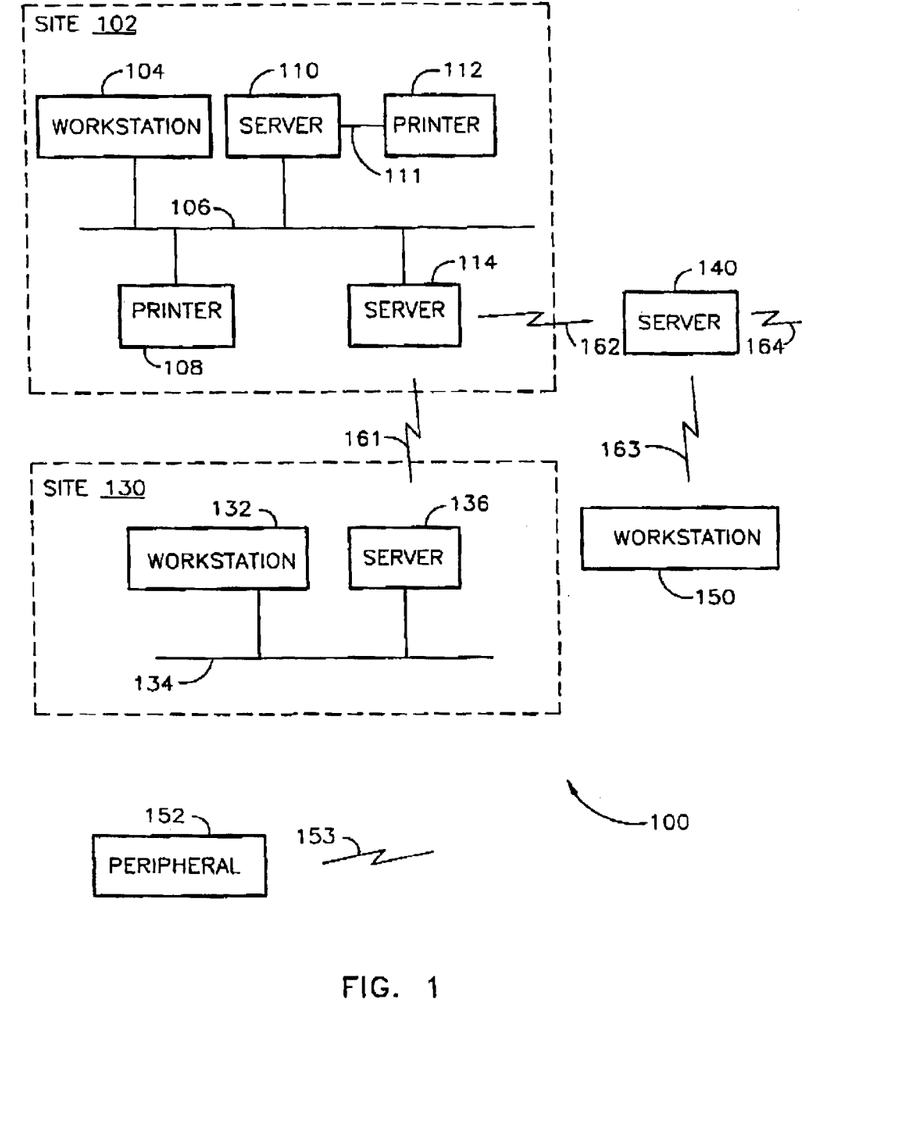
FIG. 1 is a functional block diagram of a computer system in one embodiment of the present invention.

In the example computer system of FIG. 1, peripherals are represented in general by printers, and computers are represented in general by workstations and servers. A workstation at any of several locations in the computer system may initiate and control monitoring of any of several printers. System 100 of FIG. 1 includes workstations, servers, and peripherals arranged to illustrate exemplary implementations according to various aspects of the present invention. In alternate implementations, any suitable variation in the type and number of workstations, peripherals, servers, and networks of varying topologies may be used.

Computer system 100 of FIG. 1 includes equipment at site 102, equipment at site 130, communication server 140, workstation 150, and peripheral 152. Site 102 includes intranet 106 for network communication among equipment at site 102, namely, workstation 104, printer 108, print server 110, and communication server 114. Printer 112, also at site 102, is coupled to print server 110 via direct link 111.

Site 130 includes intranet 134 for network communication among equipment at site 130, namely, workstation 132 and communication server 136.

Communication servers are linked in any conventional manner for information transfer. For example, communication server 114 is linked to server 140 by link 162; and, communication server 114 is linked to communication server 136 by link 161. Workstation 150 is linked to communication server 140 in any conventional manner, for example, link 163. Peripheral 152 represents any peripheral (e.g., a device or instrument as discussed above) and is linked 153 to any server and/or any workstation for network communication.

A network supports one or more links for network communication. A link includes any conventional temporary or dedicated communication channel, for example, a data bus, a local area network, a wide area network, a telephone line, or a radio, television, microwave, optical, or acoustic channel; and, processing (e.g., a protocol stack) at each end of the link. The location of one or more workstations 150 with respect to communication server 140, the location of one or more communication servers 140 with respect to communication server 114, and the location of one or more peripherals 152 with respect to other portions of system 100 may vary. Communication server 140 may represent any number of communication servers coupled for network communication via link 164 (e.g., a regional network, the Internet, or the World Wide Web). Each communication server is referred to as a node of the system's network which includes intranet 106, intranet 134, and links 161 through 164.

Any interprocess communication may be used for network communication according to various aspects of the present invention. Particular benefits are obtained by using plain text messages, though messages formed from any codes may be used (e.g., encrypted text, text with indicia of font and layout, any so-called mark-up language such as HTML or XML, JAVA byte code, protocols for object and data structure description and marshaling, and machine readable codes). When plain text messages are used, entry/edit of messages and parsing of message content may be more efficient. Messages may be conveyed between a sending process and a receiving process according to any conventional protocol, for example, RPC (Remote Procedure Calls), IPX/SPX (Internetwork Packet Exchange/Sequenced Packet Exchange), IPC (Interprocess Communication), DCOM (Distributed Common Object Module, an architecture consistent with products marketed by Microsoft), CORBA (Common Object Reference Broker Architecture), UUCP (UNIX to UNIX communication protocol), SNMP (Simple Network Management Protocol), and TCP/IP (Transmission Control Protocol/Internet Protocol). Particular advantages are obtained by using a protocol that is likely to be available to a user (or user process) as a consequence of widespread standardization and industry support. For example, any OSI (Open Systems Interconnection) session layer protocol (or higher layer) may be used including, for example, protocols using TCP/IP for email such as POP3 (Post Office Protocol) and SMTP (Simple Mail Transfer Protocol).

In operation, system 100 supports communication by email (e.g., single-point or multi-point) among workstations, among peripherals, and between workstations and peripherals. Workstations 102, 132, and 150 each include a conventional mail client. Communication servers 114, 136, and 140 include a conventional mail server. A mail server, inter alia, maintains a post office on a data storage system local to the server, places received mail in suitable storage in the post office, routes mail not addressed to any patron of its post office to another node, and cooperates with a mail client of a patron of the mail server's post office to provide suitable access to the mail server's post office. A mail client operated for a user, inter alia, forms messages to be sent as email, sends email in cooperation with a mail server, and provides any suitable access to email addressed to that user. In system 100, printers 108 and 112 and peripheral 152 each include processor that supports some of the functions of a mail server and of one or more mail clients.

Network communication of a message by email may include packet transfer of a file with acknowledgment and retransmission support to assure delivery or to direct failure analysis. For each email message, the file being transferred may include portions (e.g., in plain text) herein called an envelope, a header, and a body. The envelope may include information describing one intended recipient (e.g., an email address including an identifier of a host computer having a post office and an identifier of a mail box in that post office). When forwarded from one node to another, the envelope may be rewritten or revised to include intended or actual routing (e.g., a host name of a node or router, and time and date of routing). The header (analogous to the inside address on a letter) may include information describing each of one or more intended recipients (e.g., an email address, a reference to a predefined mailing list of email addresses, and aliases for email addresses). The header may in addition include a subject field for a plain text description of the body. The body may include text (e.g., plain text or other human readable text) and attachments, where an attachment includes the contents of a file in any conventional file format.

To send a message by email a user may use any plain text editor to prepare the body (or use a mail client having an integrated editor); then, present the body and information describing intended recipients to a mail client. Any mail client may be used including a mail client of the type provided via the Internet or World Wide Web, for example, a program called SENDMAIL may be used or adapted for a particular implementation of system 100 in accordance with conventional software engineering techniques. Sendmail is available from ftp://ftp.sendmail.org and described in "sendmail Second Edition" by Bryan Costales with Eric Allman, published by O'Reilly & Associates, Inc. A mail client executed by a processor in a peripheral (e.g., printer 108 or 112) may be revised to eliminate functions typically useful for a mail client for a workstation when such functions are not needed within the context of a limited variety of messages formed by predetermined processes also executed by a processor (e.g., the same processor) in the peripheral.

Methods of the present invention (e.g., methods for monitoring a process or peripheral) may employ any command syntax and semantics to facilitate the transfer of information between processes. For example, in a system according to various aspects of the present invention, commands and replies in any suitable syntax may be provided in the body of email messages to accomplish the purposes described in Table 1. In system 100, for example, each peripheral (e.g., printer 108 or 112) is identified with its own unique email address.

TABLE 1

| Purpose | Description |
| --- | --- |
| Access Control | For security and to permit configuration control of the peripherals and/or processes in a computer system, a system manager may limit access to the status of a peripheral or process. A user or other process may be granted permission to review peripheral or process status as limited to particular state variables, particular groups of state variables, or for limited periods of time. A user or other process may be granted authority to reconfigure the peripheral or process as limited to particular state variables, ranges of values for particular state variables, groups of state variables (e.g., an operating mode control), or a set of values for a group of state variables (e.g., a particular operating mode for an operating mode control). |
| Subscription | When permitted to do so, users or other processes may subscribe to receive notice of changes in the status of a peripheral or process. The subscription request may include information describing the user or other process to send notice to (i.e., the recipient), a reference to one or more state variables (e.g., a identifier of a state variable or an identifier of a report), and conditions that when met will cause notice of a change of the state variable or the specified report to be prepared and sent to the recipient. Such notices or reports will continue to be sent (without further user interaction) until the subscription is canceled. |
| Reconfiguration | A user or other process having appropriate authority may specify changes to any setting of a process or to any setting or the contents of any device in a peripheral. Memory in the peripheral may include storage of information related to access control, reports, operating modes, subscriptions, and conditions for preparing and sending reports. |

A peripheral, according to various aspects of the present invention, supports any conventional peripheral functions (e.g., input, output, or input/output) as described above and includes a processor and a network controller for network communication involving the processor. A peripheral may include one or more processors. Network communication functions may be executed by the same processor used for other functions of the peripheral. For example, printer 108 of FIG. 2 includes print engine 202, media handler 206, print controller 204, processor 208, memory 212, network controller 214, and bus 210 coupling print controller 204, processor 208, memory 212, and network controller 214. Print engine 202, media handler 206, print controller 204, bus 210, memory 212, and network controller 214 are of conventional structure and include conventional software and firmware except as described below. Processor 208 may include any conventional microcontroller or microprocessor based circuit.

Figure 2:
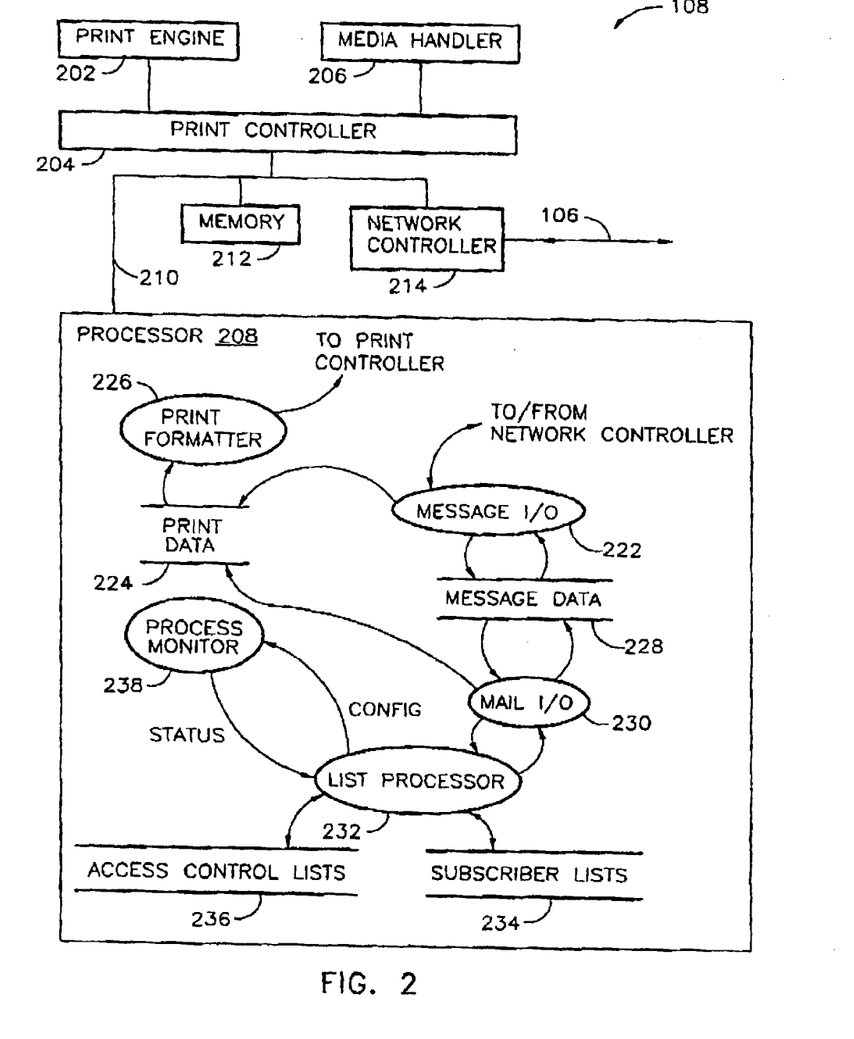
FIG. 2 is a functional block diagram of a printer of the computer system of FIG. 1.

Processor 208 executes various processes for performing all peripheral and network communication functions of peripheral 108. Although all such processes may be implemented in a single process or in various numbers of processes partitioned in any suitable manner, particular advantages are obtained in printer 108 by processes that cooperate, for example, as shown in FIG. 2 where peripheral and network communication functions are supported by the following processes: print formatter 226, message I/O 222, mail I/O 230, list processor 232, and process monitor 238. Processes may be implemented using any software technology or a combination of hardware and software technology.

In addition to printing in accordance with data received via intranet 106 through network controller 214, these processes may cooperate to accomplish the purposes described above using a command/reply session. Any command semantics and syntax may be used to accomplish the purposes discussed above with reference to Table 1. One implementation according to various aspects of the present invention is described in Table 2. In Table 2, the descriptions apply within the context of a particular peripheral that receives the command to effect, for example, access control, aliases, subscriptions, and reconfiguration. Angles "< >" enclose named parameters which the user replaces with argument values. In a reply, the parameter names are replace by the peripheral with appropriate values. Repetition is indicated ", . . . " for a comma separated list. Brackets "[ ]" surround optional forms. Braces "{ }" and the vertical bar "|" indicate alternatives from which one form must be used. Replies are prefixed by an arrow "->".

TABLE 2

| Command/Reply | Description |
| --- | --- |
| SETACL <Addressee>, . . . ({+|-} <AccessControlCode>), . . . | Addressees are associated (or disassociated) with respective access control codes known by the peripheral or process being monitored. Access control codes are pre-requisites, inter alia, for access to menu levels, for acceptance of a subscription, and for successful processing of various commands including SETACL. |
| -> SETACL {Succeeded | Failed} | |
| APPOINT <Addressee>, . . . ({+|-} <Role>), . . . | An addressee is associated with a predefined role to simplify specifying access control, inter alia, for subscribing and invoking a reconfiguration. |
| -> APPOINT {Succeeded | Failed} | |
| PERMIT {<Addressee> | <Role>} {<ReportID> | <ModeControl>} | Permission is granted for an addressee (or all addressees associated with a role) to, inter alia, subscribe to a particular report or invoke reconfiguration according to a particular operating mode control. |
| -> PERMIT {Succeeded | Failed} | |
| MENU [<MenuLevel> <MenuSelection>] | Provides a list of menu items. A user or other process may respond to such a list with a MenuSelection to traverse a hierarchical menu or a menu driven command entry session. |
| -> <MenuLevel> <MenuItemList> | The contents of any memory may be obtained as a list of menu items. The menu level is provided for use in a subsequent MENU command as described above. |
| SUBSCRIBE (<Addressee>, . . . {+|-} <ReportID>), . . . | The addressee is added to a subscriber list associated (or disassociated) with each specified report. Report identifiers may be described in particular menu item lists. In alternate forms of this command, reporting criteria (discussed below) may be identified or defined in place of ReportID; or, additional commands may be used to associate reporting criteria with each particular ReportID. |
| -> SUBSCRIBE {Succeeded | Failed} | |
| SETALIAS <Alias>, . . . {=|+|-} <Addressee>, . . . | Each Addressee is associated (or disassociated) with one or more aliases. An alias associated with more than one addressee operates as a mailing list. Use of the equals sign defines (or replaces) an alias whereas use of the plus and minus signs revise associations to an existing alias. |
| -> SETALIAS {Succeeded | Failed} | |
| CONFIG <StateVariable> = <NewValue> CONFIG <ModeControl> = <Mode> CONFIG <ModeControl> :: <Mode>, . . . CONFIG <Mode> :: (<StateVariable> = <NewValue>), . . . ) | Four forms facilitate reconfiguration. In a first form, a setting or the contents of a memory in the peripheral identified by StateVariable is set to the value specified by NewValue. In a second form, an operating mode control is set to a specified operating mode. In a third form, an operating mode control is defined to include specified operating modes. And, in a fourth form, an operating mode is defined to include specified settings of state variables. The current value and identity of a state variable or operating mode control may be provided in a report. Reconfiguration may, for example, direct the mail server to create a mail box, direct a process to edit a subscriber list, access control list, or alias list (any of which may be hierarchical), or set a physical process variable. |
| -> CONFIG {Succeeded | Failed} | |
| BATCH <Attachment> | Each line of the attachment text file is interpreted as a command to facilitate, for example, download of lists and detailed configurations. |
| -> BATCH {Succeeded | Failed} | |
| PRINT <Attachment> | The attachment, in any conventional file format, is printed. |
| -> PRINT {Succeeded | Failed} | |

TABLE 3

| Parameter | Description |
| --- | --- |
| Addressee | An identifier or Information describing a user or other process (e.g., a username, an object reference, a device name, or preferably an email address or alias) usually of a recipient or a subscriber. Wherever an addressee must be specified, a password corresponding to the specified addressee may be required. |
| AccessControlCode | Any conventional access controls (e.g., review, set, reset, delete, add, modify, install, enable a process, or block a process) may be identified (e.g., by enumeration) as may be suitable with respect to particular state variables. |
| Role | An identifier for a level of security or access control, for example, "system administrator", "network administrator", "peripheral service", "network service", "support staff", "user", or "guest". Separate roles may be defined and used for subscribing or invoking a reconfiguration. |

TABLE 3-continued

| Parameter | Description |
|---|---|
| ReportID | An identifier for a predefined presentation of peripheral status (e.g., state variable identifiers and values). |
| ModeControl | An identifier of a set of operating modes. |
| Mode | An identifier of a set of state variables with respective (e.g., default) values. |
| MenuLevel | An identifier of a menu, for example, "6.7.4" in an outline format may refer to the fourth menu at level three which is below a seventh menu at level two which is below a sixth menu at level one (i.e. the root level of a hierarchical menu). |
| MenuSelection | An identifier of a listed menu item, for example, a digit or letter. |
| MenuItemList | A list of menu items each identified by a digit or letter for user selection. |
| Alias | An identifier for an alternate Addressee or for a list of Addressees. |
| StateVariable | An identifier for a particular portion of a peripheral's status (e.g., a memory or register address, symbol, object reference, class description, or programming language declaration or reference syntax). Status may include read only and read/write state variables (e.g., for reconfiguration). |
| NewValue | Any suitable representation (e.g., numeric, string, list, symbol, or expression) for determining the value of a state variable (e.g., a bit, integer, structure, array, class, object reference, etc.). |
| Attachment | An identifier of information possibly in a format different from the body of a message (e.g., a file name for non-plain text data). |

Print formatter 226 interprets data from print data store 224 to drive print engine 202 in cooperation with print controller 204. Print formatter 226 may include any conventional formatting operations including font support, edge enhancement, rotation, color processing, and media selection and control (in cooperation with media handler 206).

Message I/O 222 receives data from intranet 106 via network controller 214 and performs (in cooperation with network controller 214) suitable protocols for one or more levels of the OSI model including, for example, the physical layer, the data link layer, the network layer, the transport layer, and the session layer. Other layers may also be supported. Message I/O 222 suitably adds data received from intranet 106 to print data store 224, which may be organized as a print buffer, pipe, or FIFO. Data in print data store 224 may conform to any conventional printer control language, for example, PCL printer control language (a trademark for a product marketed by Hewlett Packard) or POSTSCRIPT printer control language (a trademark for a product marketed by Adobe Systems).

Message I/O 222 distinguishes data intended for printing from other network communication containing commands as described above (e.g., email) and stores the later in message data store 228. Message I/O 222 also reads data from message data store 228 (e.g., formatted as a message containing a reply as discussed above) and accomplishes sending the data via network controller 214 onto intranet 106.

Message data store 228 may operate as a buffer, a FIFO, a database, or as a directory of files. Messages in message data store 228 may conform to any conventional format, for example, defined by one of the protocols discussed above. When network communication is accomplished by email, any email format may be used, for example, SNMP, SMTP, MIME (Multipurpose Internet Mail Extension), or SMIME (Secure MIME).

Mail I/O 230 receives messages containing commands from message data store 228 and stores messages containing replies in message data store 228. Mail I/O 230 performs the functions of a mail server as discussed above for providing access to received messages to any process executed by processor 208. Mail I/O 230 may in addition provide the services of a mail client as discussed above for the preparation of properly formatted email messages from data supplied by other processes executed by processor 208. Further, Mail I/O 230 may read properly formatted email messages, determine data for one or more processes executed by processor 208 and provide the data in any format suitable for such processes.

For example, print formatter 226 may have one or more mail boxes in a post office supported by mail I/O 230. As a mail client, mail I/O 230 may read incoming mail addressed to these mail boxes (e.g., to parse a PRINT command) and write contents of the messages or attachments to print data store 224. Process monitor 238 may have one or more mail boxes; and, mail I/O 230 may read incoming mail addressed to these mail boxes (e.g., to parse a CONFIG command). Process monitor 238 may provide data from which mail I/O 230 creates a message containing a reply to be sent. The addressee used may be a predetermined or default addressee (e.g., signaling connection of printer 108 for coordinating automated installation). List processor 232 may have one or more mail boxes; and, mail I/O 230 may operate as a mail client, for example, to place mail in mail boxes according to the command and to prepare messages containing replies (e.g., acknowledgments) from data and addressees known to mail I/O 230. List processor 232 may provide information from which mail I/O 230 creates a message containing a reply.

Memory 212 of FIG. 2 represents the data storage function of any of the functional blocks coupled to it by bus 210. For example, memory 212 may include storage for instructions executed (or interpreted) by processor 208; storage for data used by any process executed by processor 208; and registers and register sets used by print controller 204 or network controller 214. Memory 212 may be implemented by any conventional combination of memory devices (e.g., circuits, drives, semiconductor devices, magnetic devices, and optical devices).

Process monitor 238 provides an interface for reading any status (e.g., a state variable) accessible to processor 208 and for invoking any reconfiguration to any device or process controllable by processor 208. Process monitor 238 may read or write any configurable device including any setting (e.g., closing a switch in processor 208, print controller 204, print engine 202, media handler 206, or network controller 214) or any portion of memory 212 as discussed above. Generally, status includes any physical process variable available by virtue of the design and functions of a computer peripheral. For example, status for printer 108 may include print engine information (e.g., dates, times, rates, temperatures, humidities, vibration, shocks, current quantities of consumables, installed/operable features, and device metrics related to utilization), media handler information (e.g., media types, and status analogous to print engine information), information describing printer controller, network controller, memory, and processor (e.g., dates, times, operating environment, installed/operable features, utilization metrics such as current/min/max capacity in a predetermined period of time), and information describing processes executed by processor 208 (version identification, certification, errors, and utilization metrics such as current/min/max latencies and operation durations). The status of printer 108 may be described as a multiplicity of named state variables each having a value selected within a set of valid values for that state variable. Process monitor 238 may perform validity checks and provide error descriptions for status read or for attempts to write new values for state variables. A state variable may have any form suitable for implementation (e.g., a bit, a register, an integer, an array, a string, a data structure, a portion of RAM, a file, a file attribute, a directory, an index, or combinations thereof).

List processor 232 may include any of the functions generally associated with a mail client and/or a mailing list distribution system. For example, list processor 232 may include suitable functions of the type performed by LIST-SERV (a trademark for a product marketed by L-Soft International, Inc.). For example, list processor 232 receives from mail I/O 230 messages containing commands (or receives commands directly as discussed above), provides to mail I/O 230 messages containing replies (or provides information for construction of a such a message as discussed above), directs collection of status and changes to configuration by controlling process monitor 238, receives values of state variables from process monitor 238, maintains access control lists 236, and maintains subscriber lists 234.

Access control lists 236 may include any architecture for the storage and recall of addressee information that is associated with access control information for state variables. The association of addressee, access control code, and state variable identifier may be made in any conventional manner including one or more arrays, data structures, or records. When a state change is detected, access to a list of associated addressees may be desirable; and, when an addressee requests a reconfiguration, access to a list of state variables may be desirable. Therefore, access control lists 236 may include one or more indexes for efficient recall of associations.

In alternate implementations, reference to groups of state variables may be made to facilitate assignment of suitable access control codes. For example, when permission is granted for an addressee to receive a report (e.g., by a PERMIT command), suitable associations of the addressee and access control codes for all state variables in the report may be automatically made. Likewise when permission is granted for an addressee to assert a particular command (e.g., by a PERMIT command), suitable associations of the addressee and access control codes for all state variables affected by the command may be automatically made. Further, roles may be defined to include permission for particular reports and commands. When an addressee is associated with a role (e.g., by an APPOINT command), suitable associations of the addressee to access control codes for state variables may be automatically made. Forms of the CONFIG command may be defined with respect to predefined operating modes of operating mode controls. For example, reconfiguration may be made by applying a predefined group of values to a group of state variables. Each group of values may be defined as an operating mode for a mode control. When an addressee (or a role) is given authority to invoke a CONFIG command with reference to a particular mode control (or a limited set of operating modes for a mode control), appropriate access control codes may be associated with a particular addressee for a limited capability.

Subscriber lists 234 may include any architecture for the storage and recall of addressee information and reporting criteria. Addressee information may be in any form as discussed above with reference to access control lists 236. Reporting criteria may include a identifier that identifies a report (e.g., identifying one or more state variables whose identifiers and values are to be reported), a publication criteria (e.g., conditions that when satisfied direct a report to be created as a publication), and a delivery criteria (e.g., conditions that when satisfied direct a publication to be sent). Examples of various criteria are described in Table 4.

TABLE 4

| Reporting Criteria | Description |
| --- | --- |
| Report Identification | A ReportID or a list of one or more StateVariables as discussed above. |
| Publication Criteria | Any suitable criteria for avoiding unnecessary report creation including, for example: await tested value to go out of (or enter) a specified range a specified number of times in a specified period of time. Adaptive ranges may be used. Any tested value may be derived from one or more measured values. The tested value may be a rate of change, or may be filtered or averaged. A tested value may be any state variable; a calendar date, formula, or time-of-day; or a quantity (or absence) of accumulated data. |
| Delivery Criteria | Any suitable criteria for avoiding undesirable network traffic or irritating an addressee including, for example: send only during specified time of day depending on email address; do not send more than a specified maximum number of identical reports to the same addressee in a specified period of time; send specified report types immediately; delay between sending identical reports where delay increases in a 1-2-5 sequence; send to primary addressee and if same report is published in a specified period of time, send instead to secondary addressee; and do not send to more than a specified number of addressees to avoid alias recursion and looping. |

Figure 3:
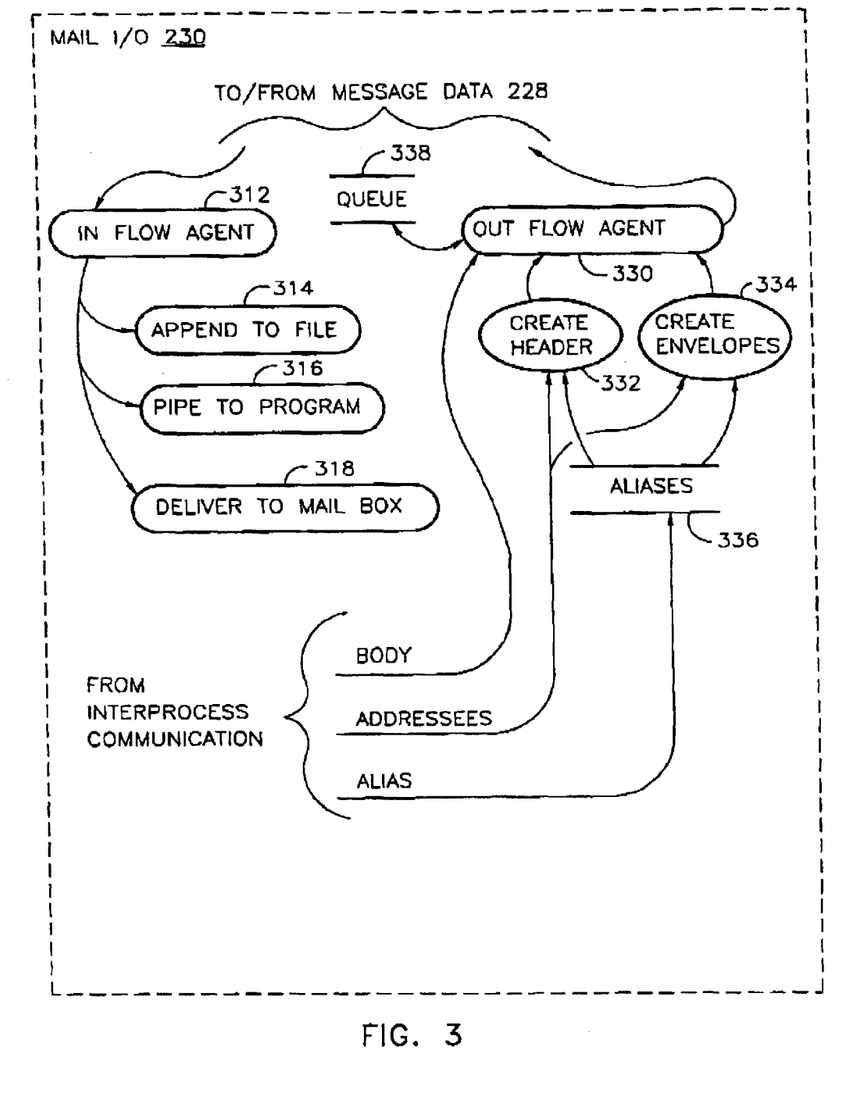
FIG. 3 is a data flow diagram of the mail I/O process of the printer of FIG. 2.

Mail I/O 230 in the exemplary implementation of FIG. 3, according to various aspects of the present invention, includes the following processes: in-flow agent 312, append-to-file 314, pipe-to-program 316, deliver-to-mail-box 318, out-flow agent 330, create-header 332, and create-envelopes 334.

In-flow agent 312 receives messages (e.g., each as a separate data structure or file) from message data store 228. In-flow agent 312 determines on the basis of the message format or content which of process 314, 316, or 318 is to dispatch the message. For example, messages received in a file transfer protocol as used by a file transfer program may be handed off to process 314; messages received in a CORBA format may be passed to process 316 (e.g., a data structure including a mailing list); and messages received in a MIME (or SMIME) format may be passed to process 318. In-flow agent 312 may examine the content of an email message for attachments and pass attachments to process 314. Other email content may indicate special handling, for example, content directing reconfiguration of a type that may not be suitable for handling by list processor 232 may be passed to process 314 (e.g., peripheral software updates or installs, and JAVA class updates or installs) or process 316 (e.g., buffer clear and restart commands, and peripheral software version number queries by automated update processes).

Append-to-file 314 may accept message content and store it in a file system maintained by the processor of the peripheral. Message content may be appended to an existing file or be used to establish a new directory or new file.

Pipe-to-program 316 may accept message content, assure adequate memory space is available for use by the program (identified by default, or by the current or prior messages) and make the message content available to the program in any conventional manner.

Deliver-to-mail-box 318 may accept message content, analyze the envelope or header portion of the message and place the body in a suitable mail box. The envelope and header may be placed in the mail box with the body or may be discarded.

When a process prepares a reply, the body and one or more suitable addressees are provided to mail I/O 230. Addressees are accepted by create-header 332 and are expanded or are substituted with addressees that are determined in a conventional manner by create-header 332 with reference to aliases store 336. Addressees are also expanded or substituted by create-envelopes 334 in a conventional manner.

Out-flow agent 330 combines the header created by create-header 332 with the body and an envelope from create-envelopes 334 and stores the combination in queue 338 as a message to be sent. This process is repeated for each envelope until all envelopes for this body have been used. Out-flow agent 330 passes a copy of each message recalled from queue 328 to message data store 228. When the successful sending of a message is confirmed in any conventional manner, out-flow agent 330 deletes the message from queue 338; otherwise, out-flow agent 330 may repeat the step of passing a copy of a message to message data store 228 for a subsequent attempt at sending the message.

Aliases store 336 may have any conventional organization and may be initialized or revised as discussed above. Aliases store 336 may be organized as a list or entries, each entry having an alias and an addressee. Multiple entries for the same addressee may be used for mailing lists. In an alternate implementation, aliases store 336 is organized as an array of linked lists with an index of pointers to array entries to enable sorting and efficient access.

Figure 4:
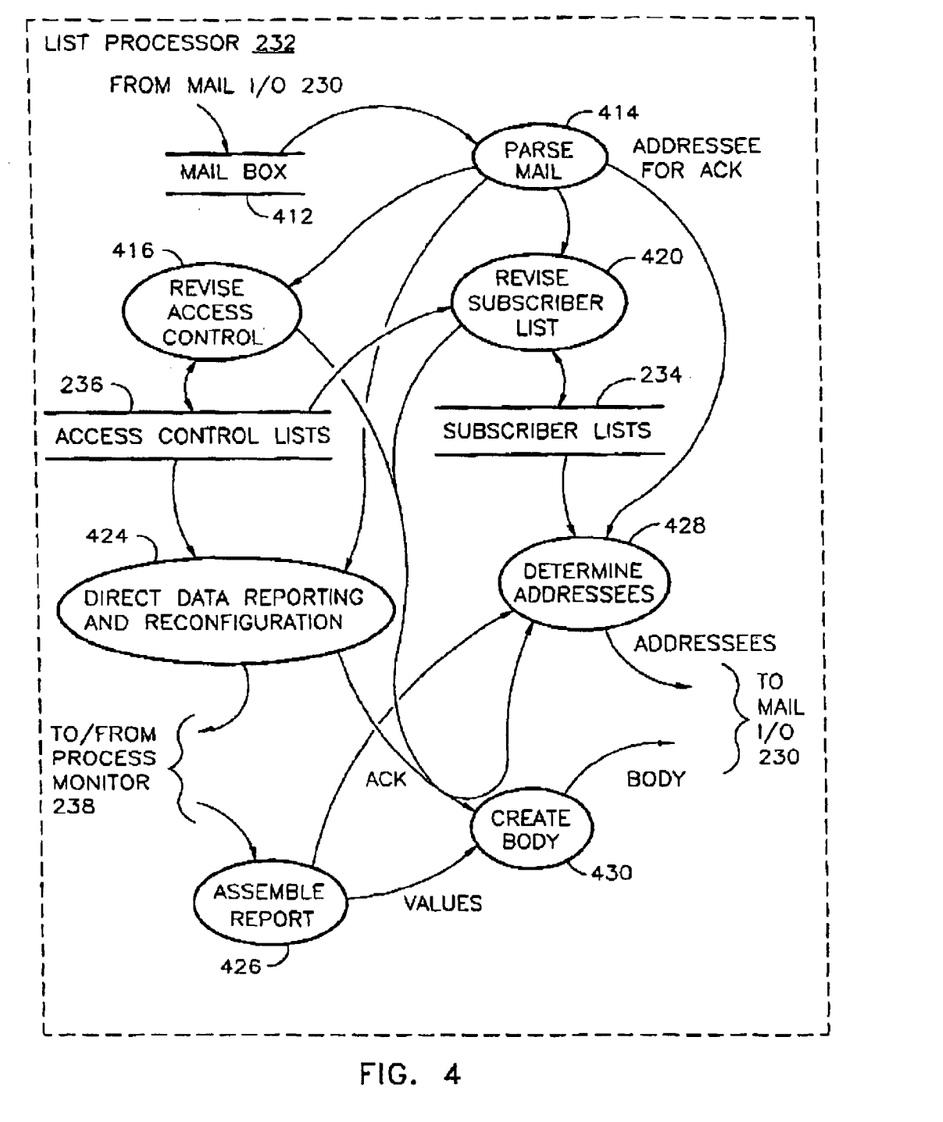
FIG. 4 is a data flow diagram of the list processor of the printer of FIG. 2.

List processor 232 in an exemplary implementation of FIG. 4, according to various aspects of the present invention, includes the following processes: parse-mail 414, revise-access-control 416, revise-subscriber-list 420, direct-data-reporting-and-reconfiguration 424, assemble-report 426, determine-addressees 428, and create-body 430.

Parse-mail 414 monitors the contents of the mail box bearing the address of the peripheral (or the address of the list processor if other processes use mail boxes maintained by mail I/O 230). On receipt of mail directed to list processor 232, parse-mail 414 parses the mail by (a) reading a message from mail box 412 and (b) determining from the body of the message whether to pass the message to process 416, 420, or 424. When the body includes a BATCH command and an attachment as discussed above, parsing further includes determining from each line of the attachment whether to pass the line to process 416, 420, or 424 until all lines of the attachment have been parsed. The determination may include conventional command line syntax analysis, for example, comparing portions of the message or line to predetermined text strings (e.g., "SETACL" etc.) to identify a command, validating values of arguments provided in the syntax of the command, and preparing a data structure for passing to the appropriate process.

Revise-access-control 416 receives argument values from parse-mail process 414 and adds, deletes, or modifies information in access control lists 236 in any conventional manner. Notice of completion of such a revision is passed to create-body 430.

Revise-subscriber-list 420 receives argument values from parse-mail 414 and adds, deletes, or modifies information in subscriber lists 234 in any conventional manner. Revise-subscriber-list 420 uses the requester's addressee information to verify appropriate entries exist in access control lists 236. Notice of completion of such a revision is passed to create-body process 430. Revision may not complete successfully when the user requesting a subscription has not been permitted to access the requested report (e.g., no prior PERMIT command, no association of access control codes for this addressee for state variable identifiers, or requested reporting criteria are inconsistent or not valid in association with this user).

Direct-data-reporting-and-reconfiguration 424 receives argument values from parse-mail 414 and directs process monitor 238 to accomplish the intent of the underlying command. For example, process 424 may identify in a data structure passed to process monitor 238 a state variable, a rate of monitoring, a definition of the extent of change that serves as a threshold for reporting a new value of the state variable, an identifier of a report (or task) by which the new value is to be reported, and a reporting period (e.g., a period from a start date/time, a duration, an expiration date/time, a total number of reports, or a schedule of reports not necessarily dependent on an extent of change). Process 424 may determine the reporting period in accordance with publication criteria and delivery criteria as discussed above. Notice of completion of such direction is passed to create-body 430.

Assemble-report 426 receives from time to time notices of new values of state variables from process monitor 238 and organizes these new values into a data structure corresponding to a predetermined report. Information specifying when the report is to be published (i.e., used to form a message) may be provided by direct-data-reporting-and-reconfiguration 424 and/or process monitor 238. Notice of a report to be published is provided to processes 428 and 430.

Determine-addressees 428 receives notice from any of processes 416, 420, and 424 of an action completed; and receives notice of a report to be published from assemble-report 426. Addressee information for sending acknowledgments is provided to determine-addressees 428 by parse-mail 414. Addressee information for publishing a report may be determined according to an identifier of the report (or task) and the identity of each addressee who is currently subscribed to receive that kind of report. Because subscriptions for the same report may vary as to publication criteria and delivery criteria, determine-addressees 428 selects addressees to satisfy these criteria as to each subscription (e.g., an addressee may be named on multiple subscriptions for the same report with different reporting criteria).

Create-body 430 operates to create the body portion of each acknowledgment message and to create the body portion of each report message. For an acknowledgment message, notice of the action completed by processes 416, 420, and 424 is received and create-body 430 prepares a predetermined reply (e.g., as discussed above) in any conventional manner.

A method of operating a system according to various aspects of the present invention may include any method for maintaining a peripheral or process via network communication with reference to a subscription that is received by the peripheral or by the monitoring processor and thereafter directs publication of reports from time to time while the subscription is active. By including reporting criteria, as discussed above, in the network communication, the effect on network utilization of monitoring and maintaining several peripherals may be managed to avoid excessive network traffic. For example, method 510 of FIG. 5 as performed by a user or other process from one or more workstations accomplishes maintaining a peripheral with monitoring and reconfiguration. The steps of method 510 may be accomplished with any lapse of time between steps and suitable portions of the method may be repeated to revise or cancel subscriptions no longer of interest.

Figure 5:
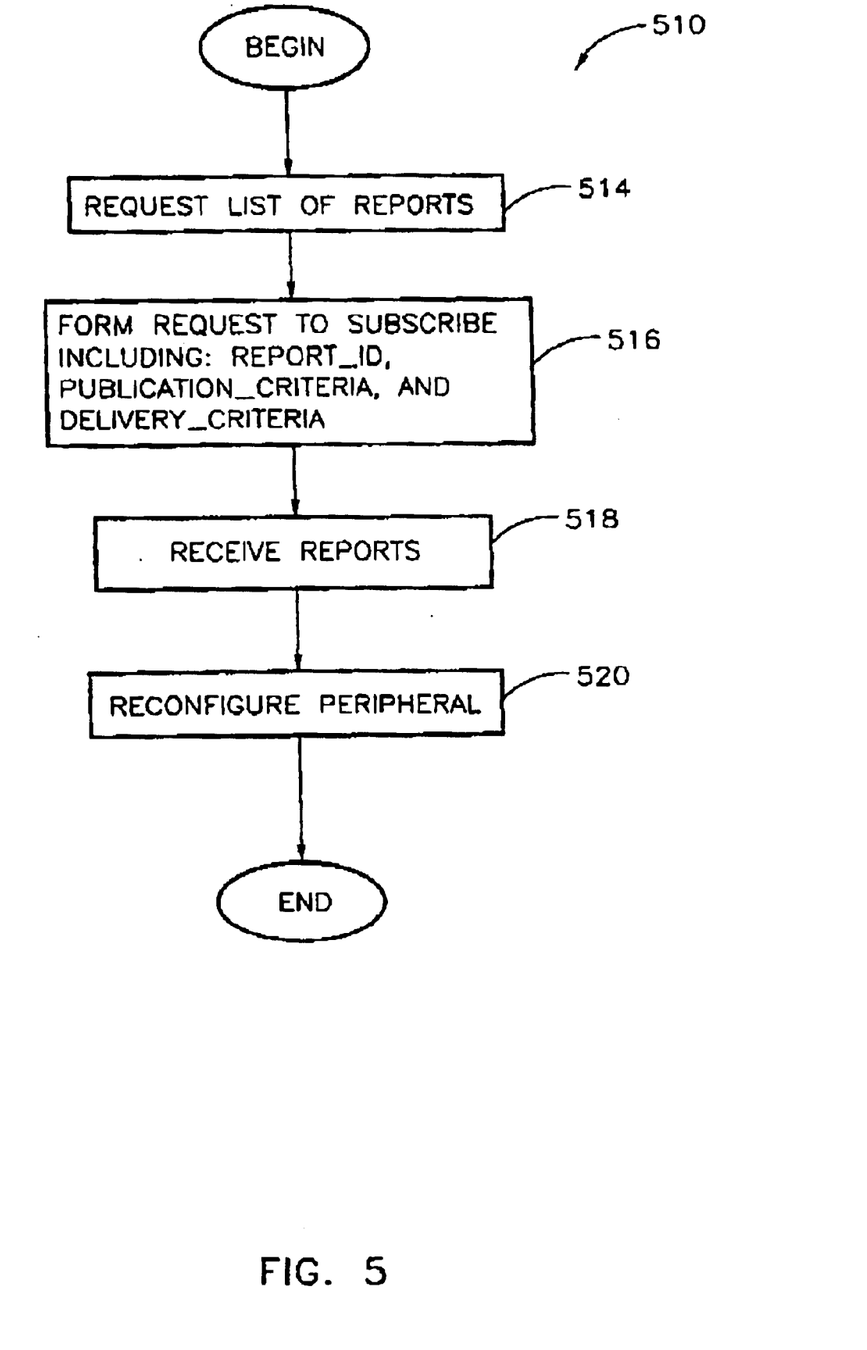
FIG. 5 is a process flow diagram of a method of operating the system of FIG. 1.

Prior to performing method 510, a system manager may configure a peripheral for being monitored or maintained by any user or other process. Initialization may include (a) defining access control codes for use with this peripheral; (b) defining roles for groups of users and the access control codes appropriate for each role; (c) assigning roles or access control codes to each user (e.g., by username, email address, etc. as discussed above) expected to be interested in subscribing to status from this peripheral; (d) defining aliases (e.g., mailing lists); (e) specifying the contents of various reports and the role or access control code prerequisites for reviewing each one; and (f) entering subscriptions for reports associated with managing the peripheral, (e.g., notification of low consumable quantities directed to consumable suppliers; notification of hard error conditions directed to parts suppliers and service personnel; notification of network related emergency conditions to network service personnel; notification of network related busy conditions to network management personnel; and notification of media low and various environmental abnormalities to co-located site support). Initialization may be accomplished by network communication as discussed above. For example, the system manager may form one or more messages containing commands (e.g., CONFIG, SETACL, SETALIAS, APPOINT, PERMIT, and BATCH, as discussed above) and send these messages by email to the email address of the peripheral.

At step 514, any user (whose address is initialized as a permitted addressee) may request by network communication a list of reports. For example, the user may form a message body with the MENU command as discussed above and send the message by email to the peripheral. A list of reports may be presented to the user in a message containing a reply sent by network communication. For example, a process in the peripheral may prepare a message containing a reply and send it by email to the user, as discussed above. If the user has a particular report or type of information in mind, the user may correspond by email with the peripheral by giving commands by email and reviewing replies sent by email from the peripheral. For example, using the MENU command described above, the user may navigate a hierarchical list of menu items, making selections to advance his or her search until a report is identified. Menu selections, in addition to providing a report identifier, may include a description and/or sample of the report.

At step 516, the user prepares a request to subscribe to the report identified in step 514 and sends the request by network communication to the peripheral. For example, such a request may be prepared by forming a message body with a SUBSCRIBE command as described above and sending the message by email to the peripheral. Preparation of a subscription request may be assisted by offering menu selections. For example, control may flow from step 514 to step 516 in response to a menu selection that designated the report identifier for subscription preparation. In an alternate implementation of step 514, several reports may be identified and a combination subscription request is prepared in step 516. Menu selections may list alternate values for publication criteria and delivery criteria for aiding in specifying these portions of the subscription request. Finally, the recipient of the report may be specified (if not presumed to be the user making the request). Again, menu selections may be used to assure that only permitted addressees receive the report.

At step 518, the peripheral prepares a message containing a reply to the request for subscription and sends the reply to the user by network communication. For example, a process in the peripheral may prepare a message confirming subscription and send it by email to the return address of the email message bearing the subscription request.

At step 520, after receiving and reviewing one or more reports received from the peripheral by network communication (e.g., by email), the user (initialized as an authorized addressee) may direct reconfiguration of the peripheral by network communication. For example, the user may prepare the body of a message containing a CONFIG command identifying a state variable identifier (or an operating mode control) and a new value (or an operating mode) and send the message to the peripheral by email. Further reconfiguration may be accomplished by this user from time to time. When report publication and delivery criteria are met, this user will receive a report by network communication. In other words, the subscription remains in force until canceled by the user, canceled by a system administrator, or a condition for automatically canceling the subscription occurs and a process in the peripheral deletes the subscription or marks it as inactive. By marking a subscription inactive, a system manager may have a record of subscriptions for system management purposes (e.g., operations research, failure analysis, or analysis of a breach of security).

A processor, as discussed above, includes any circuit that executes instructions of a process, for example, to provide data, communications, or control functions of a computer system. A processor may be virtual as opposed to dedicated, for example, when instructions are cooperatively executed by any one or more physical processors, not necessarily in a predetermined fashion throughout the entire duration of execution (e.g., a portion of a distributed processing application as performed from time to time by assignments from a pool of physical processor circuits).

A processor according to various aspects of the present invention may include a circuit (e.g., a microprocessor, workstation, or server) for performing a method as described below or may include cooperating circuits (e.g., bus-connected microprocessors; or workstations and servers suitably coupled as needed by any conventional network). For example, server 114 of FIGS. 1 and 6 includes processor 608, disk 611, memory 612, and network controller 614 each coupled for data communication by network 610. Items identified in FIG. 6 have structure and function as discussed above with reference to similar items numbered less 400, except as discussed below.

Figure 6:
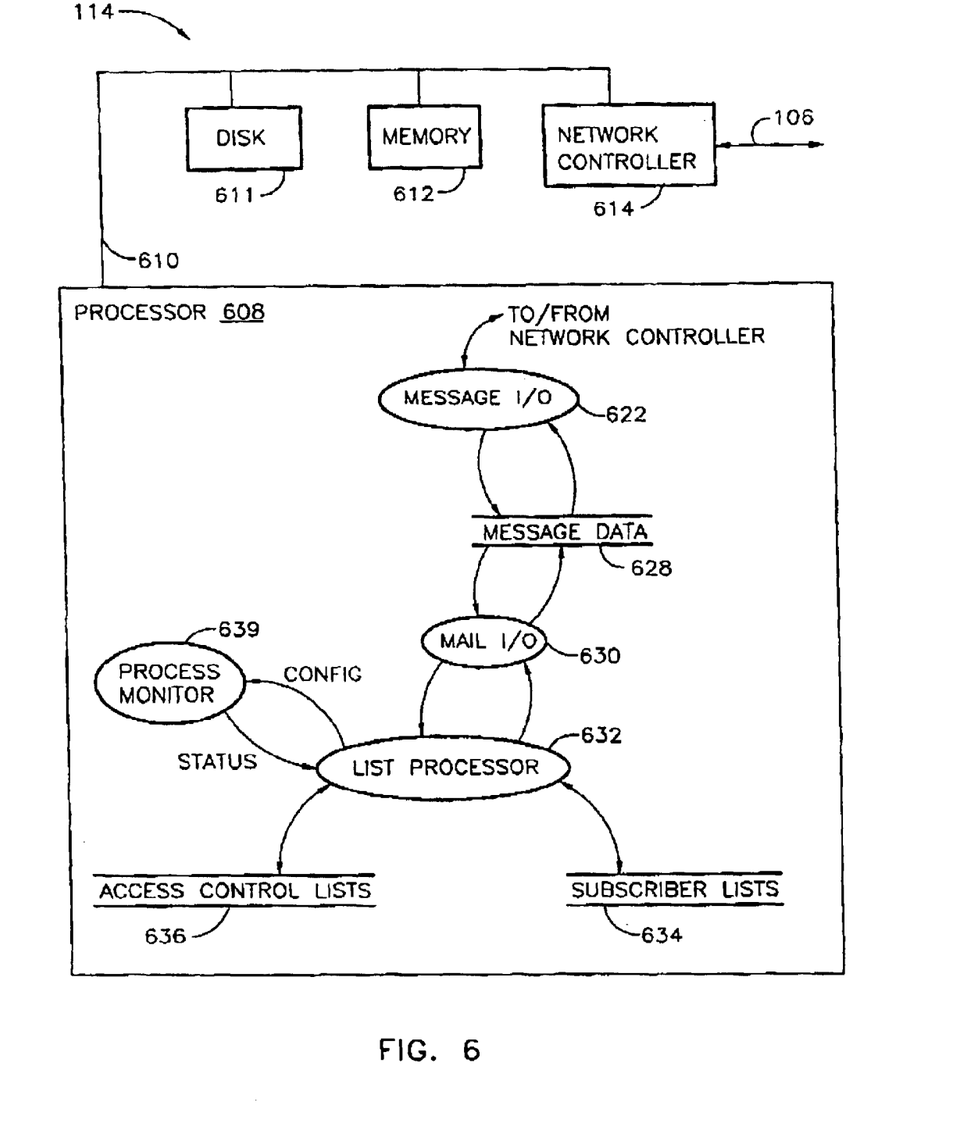
FIG. 6 is a functional block diagram of a processor of the computer system of FIG. 1.

Process monitor 639 provides an interface for reading any status (e.g., a state variable) accessible to processor 608 and for invoking any reconfiguration to any process controllable by processor 608. Process monitor 639 may read or write any portion of memory 612 to derive process status or to effect process control of one or more processes, as discussed above. Generally, process status includes any process variable available by virtue of the design and functions of an application program or computer system. For example, process status for processes monitored by process monitor 639 may include any value of a program variable, identification or certification of installed/operable version and features, data version and format currently being processed, identity of a physical processor responsible for execution, and metrics related to performance (e.g., memory utilization, errors, or actual duration of particular tasks, current/min/max latencies and operation durations). The status of any process (executed by processor 608 or otherwise monitored by processor 608) may be described as a multiplicity of named state variables each having a value selected within a set of valid values for that state variable. Process monitor 639 may perform validity checks and provide error descriptions for status read or for attempts to write new values for state variables (e.g., for controlling or reconfiguring a process monitored by process monitor 639). A state variable may have any form suitable for implementation (e.g., a bit, a register, an integer, an array, a string, a data structure, a portion of RAM, a file, a file attribute, a directory, an index, or combinations thereof).

A method for monitoring and/or controlling a process being executed by the same or a different processor may include steps 514 through 518 as discussed above and as applied in the context of monitoring a process. In place of step 520, reconfiguration of the monitored process may be accomplished in any suitable manner as discussed above. For example, when a product dispensing process (e.g., a beverage or newspaper vending machine or a process of the type described in U.S. Pat. No. 5,797,515) is monitored or subject to reconfiguration, a user suitably authorized for appropriate access may subscribe to status including the number of each type of product dispensed, the identification of customers receiving product, times of delivery, dates of restocking and maintenance, errors, etc. Such a subscription may include reporting criteria as discussed above, including for example, publication criteria and/or delivery criteria. A service providing process (e.g., a down-load agent for delivery of data or an accounting or inventory subsystem for maintaining data) may similarly be monitored or subject to reconfiguration. A user who is suitably authorized for appropriate access may subscribe (or a subscription for such a user may be defined by another suitably authorized user) to status for receiving an invoice for product or services received (e.g., restocking) or delivered. Still further, a user or program may be notified by subscription to control (e.g., in response to or in accordance with status reported to it) any other device or process. For example, a first process may subscribe to a report of the frequency of downloads provided by a second process and use that information (a) to periodically invoke a third process for gathering data for use by the second process (e.g., identities of alternate suppliers) and (b) to control the second process (e.g., to change the price being charged for the download service).

When, for example, a system according to various aspects of the present invention includes peripherals or processes (e.g., servers or instrumentation) at fixed or mobile locations, a user, program, or another peripheral may subscribe to a report (e.g., of raw measurements or results) according to reporting criteria discussed above. Publication criteria may-include a condition based on location or a condition based on information reported by another peripheral (e.g., sufficient raw data is received for analysis, a redundant peripheral is unavailable, a network communication failure or diagnostic was observed, or a function of a particular peripheral is to be performed by a substitute or supplemental peripheral). Greater system flexibility and reliability may result.

The foregoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. A computer system peripheral comprising:
 a. a network interface;
 b. a print engine; and
 c. a processor that controls the print engine in response to data received via the interface, that receives an emailed request via the interface, that evaluates a condition for controlling access to a status of the peripheral, and that sends an emailed response via the interface, wherein:
  (1) the emailed request comprises indicia of a subscription for the status of the peripheral and indicia for satisfying the condition for controlling access to the status, the request comprising a first message and a second message including indicia of a selected alternative;
  (2) the emailed response comprises a respective value of the status;
  (3) the processor, in response to the first message, provides a menu of alternatives; and
  (4) the processor, in response to the second message, determines the subscription in accordance with an alternative of the menu that corresponds to the indicia of the selected alternative.

2. The computer system peripheral of claim 1 wherein sending an emailed response comprises conveying a plurality of responses by email.

3. The computer system peripheral of claim 2 wherein:
 a. the processor performs a plurality of processes; and
 b. the processor stores received email in a respective mail box of a plurality of mail boxes, each respective mail box associated with a respective process of the plurality of processes.

4. The computer system peripheral of claim 1 wherein sending an emailed response comprises conveying the emailed response in accordance with SMTP.

5. The computer system peripheral of claim 1 wherein the indicia for satisfying the condition comprises indicia of a role.

6. The computer system peripheral of claim 1 wherein:
 a. the indicia of subscription identifies a publication criteria, and
 b. the processor sends the emailed response in accordance with the publication criteria.

7. The computer system peripheral of claim 1 wherein:
 a. the indicia of the subscription identifies a delivery criteria; and
 b. the processor sends the emailed response in accordance with the delivery criteria.

8. A computer system peripheral comprising:
 a. a network interface;
 b. a print engine; and
 c. a processor that controls the print engine in response to data received via the interface, that receives an emailed request via the interface, evaluates a condition for controlling access to a state variable of the peripheral, and determines the state variable in accordance with a value, wherein the emailed request comprises indicia for satisfying the condition for controlling access and comprises the value, wherein
  (1) the emailed request further comprises indicia of a subscription for the status of the peripheral and indicia for satisfying the second condition for controlling access to the status;
  (2) each emailed response comprises a respective value of the status; and
  (3) the processor evaluates a second condition for controlling access to a status of the peripheral and sends a plurality of responses via the interface, provides a menu of alternatives in response to the first message, and determines the subscription in accordance with an alternative of the menu that corresponds to the indicia of the selected alternative in response to the second message.

9. The computer system peripheral of claim 8 wherein the processor stores received email in a respective mail box of a plurality of mail boxes, each respective mail box associated with a respective process of a plurality of processes.

10. The computer system peripheral of claim 8 wherein the indicia for satisfying the condition comprises indicia of a role.

11. The computer system peripheral of claim 8 wherein sending an emailed response comprises conveying a plurality of responses by email.

12. The computer system peripheral of claim 8 wherein sending the emailed response comprises conveying a plurality of responses in accordance with SMTP.

13. The computer system peripheral of claim 8 wherein:
a. the indicia of subscription identifies a publication criteria; and
b. the processor sends the emailed response in accordance with the publication criteria.

14. The computer system peripheral of claim 8 wherein:
a. the indicia of the subscription identifies a delivery criteria; and
b. the processor sends the emailed response in accordance with the delivery criteria.

15. A computer system comprising:
a. a plurality of workstations each for sending at least one of a plurality of messages by email, each message comprising a respective addressee and a respective request; and
b. a peripheral coupled to the plurality of workstations by a network for communication by email, the peripheral comprising a processor that performs a plurality of processes and stores received email in a respective mail box of a plurality of mail boxes, each respective mail box associated with a respective process of the plurality of processes, wherein the processor performs a method comprising:
posting a plurality of subscriptions, each posted in response to receiving an emailed request, each emailed request comprising respective indicia of addressee and respective reporting criteria;
monitoring status of the peripheral to provide a plurality of values in accordance with a plurality of the respective reporting criteria; and
sending, in accordance with the respective reporting criteria, by email a plurality of publications each comprising a value of the plurality of values and each addressed in accordance with the respective indicia of addressee.

16. The computer system of claim 15 wherein the method further comprises:
associating a role with an addressee; and
establishing an operating mode of an operating mode control in response to an email message comprising indicia of the addressee and indicia of the operating mode.

17. A data storage medium having indicia of a method for monitoring a process, the method performed by a processor having a network interface, the method comprising:
receiving an emailed request via the interface;
evaluating a condition for controlling access to a status of the process; and
sending an emailed response via the interface, wherein:
(1) the emailed request comprises indicia of a subscription for the status of the process and indicia for satisfying the condition for controlling access to the status and a first message and a second message comprising indicia of a selected alternative;
(2) the emailed response comprises a respective value of the status;
(3) the processor, in response to the first message provides a menu of alternatives; and
(4) the processor, in response to the second message, determines the subscription in accordance with an alternative of the menu that corresponds to the indicia of the selected alternative.

18. The medium of claim 17 wherein sending an emailed response comprises conveying a plurality of responses by email.

19. The medium of claim 18 wherein:
a. the processor performs a plurality of processes; and
b. the processor stores received email in a respective mail box of a plurality of mail boxes, each respective mail box associated with a respective process of the plurality of processes.

20. The medium of claim 17 wherein sending an emailed response comprises conveying a plurality of responses in accordance with SMTP.

21. The medium of claim 17 wherein the indicia for satisfying the condition comprises indicia of a role.

22. The medium of claim 17 wherein:
a. the indicia of subscription identifies a publication criteria; and
b. the processor sends the emailed response in accordance with the publication criteria.

23. The medium of claim 17 wherein:
a. the indicia of the subscription identifies a delivery criteria; and
b. the processor sends the emailed response in accordance with the delivery criteria.

24. The medium of claim 17 wherein the request comprises a plurality of messages received independently via the interface.

25. The medium of claim 17 wherein the method further comprises determining the state variable in accordance with a value, and the request further comprises the value.

\* \* \* \* \*